United States Patent Office 3,726,667
Patented Apr. 10, 1973

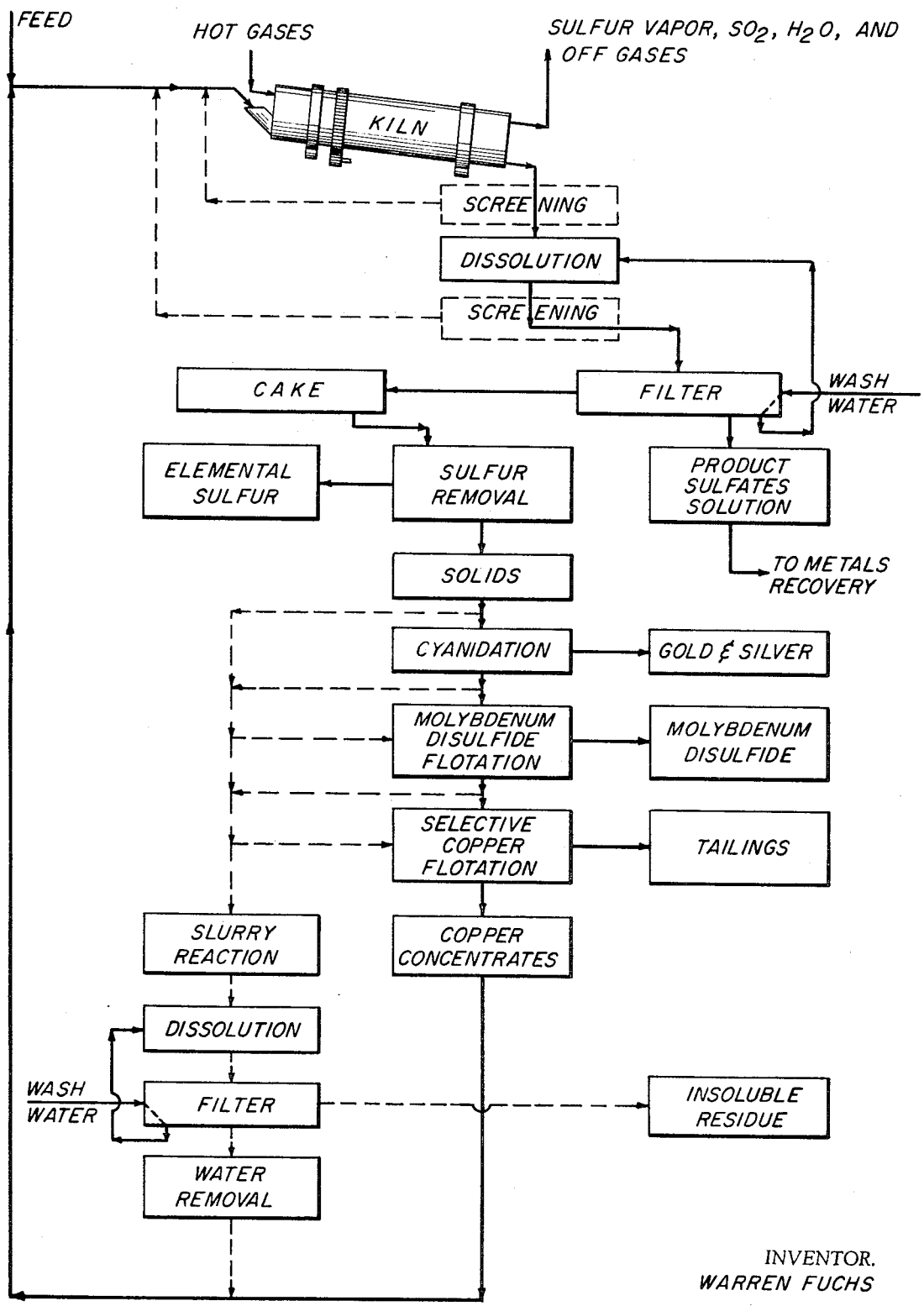

3,726,667
PROCESS OF LEACHING SULFIDE CONTAINING MATERIALS WITH HOT, STRONG SULFURIC ACID
Warren Fuchs, Long Island, N.Y., assignor to Treadwell Corporation, New York, N.Y.
Continuation-in-part of application Ser. No. 779,893, Nov. 29, 1968, which is a continuation-in-part of application Ser. No. 697,266, Dec. 18, 1967, both now abandoned. This application Oct. 29, 1971, Ser. No. 193,700
Int. Cl. C22b 15/08, 49/00
U.S. Cl. 75—101
19 Claims

ABSTRACT OF THE DISCLOSURE

Materials such as ores, concentrates, and the like containing sulfides of copper, iron, zinc, lead, molybdenum, etc., with or without precious metals, are treated with strong sulfuric acid, the concentration being maintained between 80% and 100%. The amount of sulfuric acid is less than 3.8 moles per molar equivalent in the sulfides which react and preferably is 3 moles or less. The temperature is maintained between 160° and 250° C. and the particle size of the sulfide and gangue material is preferably not in excess of 8 mesh. The reaction is effected in paste or semi-solid form in apparatus such as a rotary kiln, and preferably the concentration of sulfuric acid is maintained by evaporation of water formed. Under these conditions at least 10% of the sulfur content of the reacting sulfides, and preferably at least 50%, is recovered in the form of elemental sulfur. To improve distribution of heat and reactant, larger particles, such as inert pebbles of at least ¼", are used, which larger particles become coated with the reactants and are effectively tumbled in the kiln while reaction occurs in the coating. The reaction may be carried out in stages, with the earlier stages maximizing sulfur production and later stages under more drastic conditions after interstage removal of elemental sulfur.

RELATED APPLICATIONS

This application is a continuation-in-part of my earlier application Ser. No. 779,893, filed Nov. 29, 1968, which is a continuation-in-part of Ser. No. 697,266 filed Dec. 18, 1967, both applications are now abandoned.

BACKGROUND OF THE INVENTION

Sulfide ores are either treated as such or are concentrated or leached to recover the valuable metals. Roasting, sintering, and smelting of these ores as such or of their concentrates are the conventional methods of treatment of these materials. These methods result in the formation of large quantities of sulfur dioxide, which creates serious air pollution. In some environments this is not tolerable, and to abate this pollution some of the sulfur dioxide containing stack gases must be treated to convert the sulfur dioxide into sulfuric acid, and this usually is not economical because of cost and market limitations.

Tailings piles and low grade ores are sometimes subjected to leaching with dilute sulfuric acid, which transforms some of the metal sulfides to sulfates. The complete transformation to sulfates may require years.

In all of the previously mentioned methods there are losses such as slime losses in flotation due to over-grinding, slag and fume losses in smelting, ground water and absorption losses in leaching.

It has also been proposed but has not been commercially used to treat metal sulfides with concentrated sulfuric acid, for example, the old patent to Ferraris, No. 707,506.

The reaction given in the patent is represented by the following equation:

Another reaction is also known in which strong, hot sulfuric acid oxidizes sulfur to $SO_2$ and water. The equation for this latter reaction is as follows:

Another proposal is described in the German Pat. 109,151 and in its corresponding Norwegian Pat. 8,015. These proposals also have not been commercially used in the United States. The German and Norwegian patents describe a process in which ores containing zinc sulfide with some lead and silver are treated with 4 moles of concentrated sulfuric acid. Part of the process is carried out in a cast iron container, and the last part of the reaction effected in a muffle furnace in paste form. It will be noted that the German and Norwegian patents carry out a reaction corresponding to both equations of the Ferraris patent, that is to say, no elemental sulfur is produced and all of the sulfur content of the ore is transformed into $SO_2$.

SUMMARY OF THE INVENTION

The present invention is based on the discovery that under suitable, very definite conditions the elemental sulfur producing and elemental sulfur consuming reactions set our above proceed at different rates. They may be considered, therefore, as competitive reactions, and the differing rates are preferably utilized to produce a maximum of elemental sulfur. When the second reaction is minimized and a large portion of the sulfide sulfur content is recovered as elemental sulfur, this can present a great economic advantage. Sulfur has a very wide market and can be economically shipped long distances.

Another reaction is also possible, namely a reaction in which sulfur reacts with the metal sulfates formed to produce a sulfide, such as covellite in the case of copper. This last reaction sets a desirable limit on the temperature which should be used in conjunction with amount of acid present in the reaction. This last reaction is also a competitive reaction and in many cases it is permissible to allow some of the reverse reaction to proceed, as the product formed can be treated in further operation of the invention and so does not adversely affect the overall recovery but involves merely a modest retreatment load.

According to the present invention the amount of sulfuric acid is considerably less than that capable of transforming all of the sulfur of the sulfide ores into $SO_2$. At least 10% of the sulfide content is transformed into elemental sulfur and preferably 50% or more. It is not possible to suppress the second reaction referred to in the Ferraris patent one hundred percent, so there will always be some of the sulfur produced oxidized further to $SO_2$. The first reaction, of course, also produces $SO_2$, but this is from the sulfuric acid and not from the sulfide of the ore; whereas in the second reaction the additional 3 moles of $SO_2$ come from the sulfur which is further oxidized. Most of the metals are divalent in the sulfide in the ore, and therefore the moles of $H_2SO_4$ must be related to the molar equivalent of the metal in the sulfide. Where the sulfides have the formula MeS, the equivalent of course is one, but in the case of cuprous sulfide there is twice as much copper. If all of the sulfur in the sulfide was recovered as elemental sulfur, the ratio of moles of acid to molar equivalents is 2:1. If there is complete oxidation of the sulfur to $SO_2$, it is 4:1. With at least 10% of the sulfur recovered as elemental sulfur, the lowest practical limit of the present invention, this would correspond to 3.8 moles, 50% sulfur would correspond to 3 moles, and of course 100% sulfur, if the reaction made this possible, would correspond to 2 moles. As this is an impossibility in practice, there has to be a slight excess of sulfuric acid. For practical processes such an excess may be 20% to 25% or slightly more, which corresponds to about 2.4 to 2.5 moles of $H_2SO_4$ per reacted sulfide.

As will be brought out below, with certain ores there are sulfides which do not react at all, for example molybdenum disulfide or pyrite, and so the amount of sulfuric acid used in the present invention must be based on the sulfides which actually react, and this will be referred to throughout the specification and claims as "reacted sulfides." Even where there is a very extensive reaction with a particular sulfide, this will rarely be 100% in any practical operation, and so the ratio of moles of sulfuric acid used are only meaningful when based on the sulfides which have actually reacted with the acid to produce sulfates.

In the present invention the process, at least in its later stages, takes place in a substantially solid form as a paste with the small amounts of sulfuric acid used in the present invention, and in many or most cases the appearance of the reaction mass toward the end is that of a practically dry material. This operation is referred to in practical plants as the "bake" method.

In addition to the limitation, the amount of sulfuric acid, i.e. less than 3.8 and preferably less than 3 moles per molar equivalent, the temperature and acid concentration, based on water content, are somewhat critical. The acid concentration should be maintained at least 80%. In the bake method it is easy to evaporate water formed in the reaction, and toward the end of the reaction obviously the acid concentration will approach or even reach 100%. While in a rotary kiln it is easy to supply heat, for example with hot gases, at a rate so that water is evaporated practically as fast as it is formed, this is not essential so long as there is sufficient removal of the water, at least from time to time, so that in the later stages the concentration does not fall below 80%. Therefore, while it is advantageous to remove water substantially as fast as it is formed, it is not essential; and therefore, in its broader aspects the present invention includes processes in which the acid concentration is maintained at 80% or above even though the water formed is not evaporated substantially as it is formed.

In the bake process uniformity of distribution is of some importance, and in a more specific aspect uniformity can be increased by the presence of relatively large particles with the ground ore, which should normally be no coarser than 8 mesh although the exact particle size is not critical. The larger particles, such as relatively inert pebbles or other balls, are preferably larger than ¼". It is also possible to form balls of feed material including the acid. As the reaction proceeds and as water is evaporated, either intermittently or continuously, this tends to cement the resulting product. When larger inert particles are used, the finer ground ore coats them and provides both for satisfactory distribution and prevents undue variation with respect to temperature and acid concentration during the reaction.

Even with the limitations on acid, temperature and acid concentration, it is desirable to keep the time of reaction within that in which the reaction proceeds to a practically useful point. This limits using even the restricted amounts of acid, which are important features of the present invention. The second reaction, that is to say oxidation of elemental sulfur produced, can proceed if given sufficient time. As a practical matter, therefore, the reaction time should be kept to a point where the second reaction is minimized to the desired degree. This time cannot be set forth quantitatively as it will vary with temperature, reactivity of the sulfides, and other factors. Certain metal sulfides, such as molybdenum disulfide, will not react unless the conditions are so drastic as to oxidize all of the sulfur produced, which is not the case in the present invention. Therefore, when molybdenum disulfide is present in the ore, most or all of it is recovered in the form of its oxide or unreacted sulfide rather than sulfate.

Equations for typical minerals are as follows:

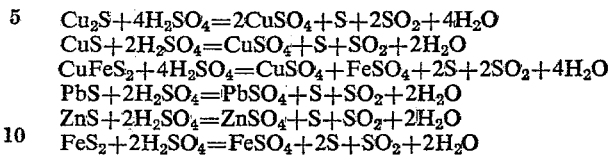

In the above equations reactive iron sulfide is encountered. As will be pointed out below in more specific description, in some cases certain ion sulfides, such as pyrite, may be substantially unreacted. This is another reason why acid amounts are based on sulfides actually reacted. The equations given are only for the first equation and assume no oxidation of the elemental sulfur produced. As has been pointed out above, there will always be some of this sulfur oxidized, but this is preferably minimized so that at least 10% and preferably 50% or more of the sulfur content of the sulfide is recovered as elemental sulfur.

Some sulfides, such as galena, are capable of reacting with sulfuric acid to produce lead sulfate and hydrogen sulfide, the reaction using considerably weaker acid. The hydrogen sulfide can easily be transformed into sulfur by known means, for example by reaction with the $SO_2$ formed or can otherwise be used. In many cases unless there are major amounts of galena, sphalerite or pyrrhotite, it is desirable not to attempt to react the ore in a preliminary stage with more dilute acid. The choice of procedure is, therefore, essentially one of economics.

In this invention where the materials treated include copper sulfide physically associated with other sulfides, such as those of iron or zinc, or in a complex sulfide mineral, such as chalcopyrite, the resulting copper sulfate can be finally treated to recover the copper content as metallic copper using the acid cyanide process with hydrogen reduction which is described and claimed in the patent to Roberts, No. 3,321,303, May 23, 1967, and there is no contamination of the product copper even though iron sulfates or other metal sulfates are present because it is the unique and important property of the Roberts method that the cuprous cyanide precipitates substantially uncontaminated by the other metals from an acid solution containing the other metals.

The temperature range of from about 160° C. to 250° C. permits choosing the best temperature on the basis of the nature of the ore or other materials. In the presence of certain substances, such as selenium and its compounds, the reaction can proceed at lower temperatures, and where these compounds are present or are built up by recycling somewhat lower temperatures may be used. With certain other substances, such as arsenic compounds, temperatures nearer the higher end of the range are required. The small amount of acid in the bake method permits operating slightly above 250° C., but this can be less desirable as some concentrated sulfuric acid may be boiled off, which creates some problems. At higher temperatures in the bake method there can be some reaction between sulfur and sulfates to form metal sulfides, i.e. a reverse reaction, but this is not necessarily a serious problem as the sulfides can be recovered by further treatment. It should be noted that in the bake method, where we are dealing with semisolid materials, the temperatures set out above refer to the temperatures of the reacting solids themselves as, of course, the heating means, such as, for example, heating gases, must be at a somewhat higher temperature in order to maintain the proper temperature in the actual reactants.

Under certain economic and mineral conditions, it may be advantageous to operate later stages of the reaction under conditions of time, temperature and concentration which will maximize sulfur production even though this may not result in complete conversion of the sulfides that are capable of reacting to form sulfates. Unreacted sulfides, of course, can be recycled after separating from the residue. In general with ores containing larger amounts of copper sulfide the reactivity is sufficient so that very little copper sulfide remains unreacted, and in some cases the amount is so small that it is preferable to discard it.

The temperature range set out above represents practical limits. With ores containing sulfides of nickel, copper and iron, it is usually preferable to operate between about 180° C. and 220° C.

The reaction products are treated to separate sulfur and to form an aqueous solution of soluble sulfate. This solution is practically free of acid, and if the ore or concentrate initially contained appreciable amounts of selenium, tellurium and silver, these can be removed and recovered by treating the solutions with sulfur dioxide, as is well known. Since the process of the present invention always produces considerable sulfur dioxide even under the most favorable elemental sulfur production conditions, there is always sufficient of this reagent available. Where there are sufficient precious metals, these may be recovered by known means, such as cyanidation.

Known methods of removal and recovery of metal values from such solutions are numerous, and the following examples are typical though many others are known. When the principal metal value is copper, known methods of recovery include electrowinning and the method claimed in U.S. Pat. 3,321,303 to Roberts, in which the solution is treated with hydrogen cyanide and either sulfur dioxide or metallic copper. This results in precipitating cuprous cyanide, which is subsequently recovered and reduced with hydrogen, producing metallic copper and hydrogen cyanide for recycle. Electrowinning is of limited usefulness when the ratio of iron to copper in the solution is high and resort may be made to treatment with lime and with aeration to precipitate the iron as a ferric hydroxide which is separated prior to the electrowinning. When zinc and nickel are present, these remain in solution for subsequent recovery. Sulfates of zinc and nickel as well as of iron remain in solution after recovery of copper by the Roberts method, and in this method, as well as in that of electrowinning of the copper, sulfuric acid is generated.

When zinc is the principal metal value in the solution, this may be recovered by electrowinning after preliminary purification of the solution. Electrowinning of zinc results in generation of sulfuric acid. Purification of the zinc-containing solution results in precipitation of nickel by treatment of the solution with zinc powder.

The above recovery methods result in obtaining spent solutions containing sulfuric acid associated with metal sulfate salts. Separation of the acid from these salts and recovery of this acid for reuse in the acid treatment stages is important to commercial success. As noted above, the acid must be recovered in concentrated form by evaporation of water. Fortunately, the solubility of the sulfates or iron, copper, nickel and zinc is reduced as the concentration of the acid approaches 70%, which permits filtration.

After separation of the solids the acid is suitable for recycle or after further concentration or fortification for the later stages described above.

It should be noted that the processes of the present invention involve a sulfate balance as well as a water balance, which has been described in conjunction with the recycling operations. In many cases this may require additional sulfuric acid, because some of the sulfates may be discarded as such, for example in certain cases iron sulfates, and of course losses of acid will occur. The acid consumed in the reactions with the sulfides must be replaced. This can, of course, be easily effected by utilizing $SO_2$ formed in later stages. The amount of makeup acid required also depends on the nature of the metals recovered and on the processes used for recovery. For example, if copper is the primary metal, the acid cyanide process when using $SO_2$ as a reducing agent produces additional sulfuric acid, and even with the alternative use of copper as the reducing agent in the cuprous cyanide precipitation step or when electrowinning processes are used there is little or no loss of sulfuric acid. On the other hand, if some of the metals are recovered in the form of their sulfates, which sometimes occurs, (for example, there is a market for copper sulfate of suitable purity), the requirements for acid become greater.

When molybdenum is present as a sulfide, it is sometimes desirable in both modifications to use conditions sufficiently mild so that most or all of the molybdenum sulfide does not react. It then remains with the gangue, from which it can be readily and efficiently removed by froth flotation. Because of the ready market for molybdenum sulfide, this is sometimes economically desirable. On the other hand, if somewhat stronger reaction conditions are used, such as higher temperatures, molybdenum oxide will be formed, which can be removed by known methods, such as alkaline leaching.

When iron is present as pyrite it is sometimes desirable to use conditions which are sufficiently mild, (e.g. 200° C., 90% $H_2SO_4$), substantially to avoid reaction of pyrite while carrying out the reaction of other minerals, viz, chalcopyrite, chalcocite, and covellite. The pyrite then remains with the gangue, from which it can be separated by froth flotation. The operation just described points up again the importance of considering that in the present invention proportions of acid to sulfide must be based on reacted sulfide and not on the total sulfide content of the ore.

It is an advantage of the invention that the reaction can be effected at ordinary atmospheric pressure. However, the invention is not limited thereto and, if desired, pressures above or below atmosphere may be employed and are included with the broad scope of the invention.

Sulfur dioxide which is a product of the reactions in later stages leaves the reaction with small amounts of water and sulfur vapor, both of which may be readily removed by condensation to produce a gas stream rich in sulfur dioxide suitable for conversion to oleum and 98% acid or for other use or for recovery for marketing. Production of rich $SO_2$ gas is an outstanding advantage of this invention.

In the bake method, where water is removed by evaporation, the overall heat balance is endothermic and therefore it is necessary to supply heat. However, heat is very cheap as compared to the means required for the removal and recovery of the excess acid. The requirement for reasonable uniformity of distribution of reactants and of temperatures in the bake method does require some care. Thus the design of the reaction vessel and the mode of its operation must be such that adequate distribution of the solids and acid is maintained. Suitable pieces of apparatus are, however, well known, such as rotary kilns, rabble hearth roasters of the Herreshoff, Wedge or Bethlehem type or fluid bed and reactors. Heating is preferably effected by hot gases circulated through the equipment. On the other hand, heat can be introduced through equipment walls or a combination of the two used. The amount of heat is, of course, determined by the temperatures to be maintained in the reaction mass. Uniform distribution of temperatures can sometimes be effected where the equipment uses mechanical rabbling or other mixing means which forcibly stir up the solids. Where, however, the mixing is due only to tumbling, for example in a rotary kiln, it is desirable to provide special means for maintaining uniformity of distribution. One such means is to provide larger particles so that the finely divided, preferably 8 mesh or less, sulfides, mixed with acid, become particles in the form of coatings. When larger particles are used they should be large enough to permit separation from the reaction products by means such as screening or washing and screening. The larger particles may be pebbles, gravel, ceramic pieces. The materials must be relatively insoluble in sulfuric acid. Relatively acid, insoluble coarse ore is also suitable. Another method to make a suitable feed to the reaction in the kiln is to form ball of the feed slurry with recycled fine kiln product. Uniformly of distribution of reactants can also be achieved by first mixing acid with the sulfides and carrying out a slurry reaction until the consistency is such that tendency to segregate is very much reduced and then forming balls of size suitable for processing with fines obtained from the product of the kiln.

When larger particles such as pebbles or gravel are used, it is also possible to provide a substantial amount of heat by introducing these particles at temperatures above the temperature to be maintained in the reacting mass. It is sometimes advantageous to supply some of the heat required for evaporating water by this means. Of course the temperature of these particles must not be so high that local excessive temperatures are produced in the reacting material. The control of the temperature is, however, in no sense critical. As it is ordinarily not practical to introduce all of the heat by hot large particles, it is usually necessary to use other means, and for this purpose hot gases are very suitable and may be considered as a preferred source of heat. Reference has been made to gravel or pebbles, but it is, of course, in no sense necessary that these be actual rock material as other suitable acid resistant material may be used.

When the bake method of the present invention is used, the resulting product composed of solids, with or without some excess acid, can be leached with water to produce a slurry and separation of insolubles by filtration then becomes easy.

In the case of a great many sulfide ores where one or the principal value is copper, pyrite occurs in important quantities. The copper minerals, chalcocite and chalcoprite, are more reactive with strong sulfuric acid than is pyrite, and so the sulfates produced will have a higher copper to iron ratio than the original ore, if acid quantities and reaction temperatures are properly limited. In many cases this enrichment of copper is sufficient so that when the acid solution from the leaching is treated by the cuprous cyanide process of the Roberts Patent 3,321,-303, referred to above, the remaining solution after cuprous cyanide precipitation contains less iron sulfate to be processed.

Where the process can be carried out to completion, that is, all of the copper transformed into sulfate, this is, of course, ideal, but in practice sometimes the reaction is carried out only partially to completion. In such a case the product of the reaction will also contain unreacted copper sulfide as well as iron sulfide, and after leaching this reports as part of the solids. It is a relatively simple matter to effect a separation of the copper mineral by a selective flotation by known means and the copper sulfide or concentrate containing a higher percentage of copper sulfide can then be recycled and the iron sulfide either discarded or otherwise used where the economics of the particular plant favor such operations. The selective froth flotation is a very old procedure, and it is an advantage of the present invention that this separation does not require developing new flotation techniques.

When the original ore feed contains molybdenum disulfide this is ordinarily left unreacted and may, of course, be recovered by froth flotation, before the selective flotation to separate copper sulfides from iron sulfide is effected in a conventional manner. Similarly, when the ores contain precious metals, such as gold and silver, these may be removed by cyanidation, which is a conventional procedure. It will also be noted that where metallic copper is produced as the final copper product by the cuprous cyanide process of the Roberts patent above referred to, the modification described in that patent in which $SO_2$ is the reducing agent in the cuprous cyanide precipitation step is often preferred because sulfur dioxide is produced in the present invention by either method. When the invention is used with copper containing ores, the cuprous cyanide process using $SO_2$ as the reducing agent permits an effective utilization of some or all of the $SO_2$ produced in the reaction, and the additional sulfuric acid formed in the cuprous cyanide precipitation process after concentration can be used economically as make-up acid.

BRIEF DESCRIPTION OF THE DRAWINGS

The drawing is a flow sheet of the bake method of the present invention and as such is, of course, partly or wholly diagrammatic.

DESCRIPTION OF THE PREFERRED EMBODIMENTS

The drawing is in the main self-explanatory. However, where there are sulfides which react with weaker acids as well as sulfides, such as copper sulfide, which requires the strong, hot acid treatment, a preliminary treatment with weaker acid may be used which will transform certain more reactive sulfides, such as galena, into corresponding sulfates, giving off $H_2S$, which can be treated by conventional means to produce sulfur, $SO_2$ and the like. This preliminary treatment is not illustrated on the drawing.

The drawing represents the bake method of the present invention, the baking device being shown as a rotary kiln with hot gases. The feed as shown on the drawing represents the feed solids plus the sulfuric acid requirement. In the case the fine kiln product is used for balling of the feed, this product is taken from the kiln product stream. In the case that larger particles of inert materials are used, they are introduced into the kiln with the feed. These larger particles can be removed from the kiln product following dissolution by screening or otherwise classifying the dissolution pulp. In such cases the recycled larger particles may be dried and preheated prior to their return to the kiln feed. The recycle of larger particles alternatively may be made directly from the kiln product prior to dissolution, the larger particles being separated by tumbling and screening or the like, and pre-heating, if desired.

In order not to confuse the drawing, acid amounts and concentrations are not set out numerically. The ranges described above must, of course, be followed, and in a more specific description below typical values are set forth.

Continuing with the drawing, after dissolution, filtration follows. The filtration provides as products a sulfate solution and an insolubles cake. The sulfate solution is processed for metals recovery. The insolubles cake is treated for sulfur removal by known techniques, such as pressure hot water centrifugation or solvent extraction. The resulting solids, now relatively free of elemental sulfur, are treated as shown. For example, in the case of gold and silver the next step is cyanidation by conventional means. In the case of molybdenite the subsequent step is conventional flotation of the molybdenite. Where there is residual unreacted copper the next treatment is the conventional selective flotation for the recovery of such copper values. The center of the drawing shows, in solid lines, the processing of material involving all of the above treatments.

Where some of the above values are absent, or where the nature of some of them requires, various described treatments may be eliminated or combined in alternative sequences as shown in dashed lines. An alternative to the selective copper flotation is to employ a slurry reaction, using sulfuric acid of the same temperature and concentration described above. This appears at the bottom left of the figure. The quantities of material being handled in this slurry reaction are relatively small, and no separation of strong acid is required. The entire mixture is diluted to solubilize the copper sulfate and then filtered to remove any remaining solids. The filtrate containing both sulfuric acid and copper sulfates is then concentrated to the required degree and returned to the kiln feed. Loss of copper is substantially eliminated.

The invention will also be described in more detail in conjunction with the following specific examples, which set forth typical treatment conditions. Parts are by weight unless otherwise specified.

Example 1

Flotation concentrates corresponding to the following analysis:

| | Percent |
|---|---|
| Cu | 29.6 |
| Fe | 24.3 |
| S | 28.8 |
| $SiO_2$ | 17.3 |
| Total | 100.0 | were mixed with concentrated sulfuric acid. The concentrate quantity was 100 parts. The acid weight was 228 parts, and the acid concentration was 96.1%. This mixture was reacted, with agitation, as 190° C. for one hour. The mixture, now thickened, was maintainetd at 220° C. for one hour. The bake product was dissolved in water and the resulting slurry filtered. The filtrate was analyzed for copper and sulfuric acid. The cake was also analyzed for copper and sulfur.

Results were as follows:

| | Content | | Distribution | |
|---|---|---|---|---|
| | Parts Cu | Parts S | Percent Cu | Percent S |
| Feed | 29.35 | 28.8 | 100.0 | 100.0 |
| Filtrate | 29.13 | 0.0 | 99.2 | 0.0 |
| Residue | 0.22 | 27.3 | 0.8 | 94.8 |

It will be noted that a very high recovery of copper was obtained together with quite a high recovery of sulfur. This represents about an optimum as it is not possible to eliminate the oxidation of some of the sulfur with $SO_2$, as has been pointed out above. The moles of $H_2SO_4$ based on molar equivalent of the sulfides which actually reacted is about 2.5, representing about 25% molar excess over the theoretical 2 moles.

Example 2

The procedure of Example 1 was repeated with the exception that the mixture was at a temperature of 220° C. for four hours. The bake product was treated in the same manner as the product of Example 1, with the following results:

| | Content | | Distribution | |
|---|---|---|---|---|
| | Parts Cu | Parts S | Percent Cu | Percent S |
| Feed | 29.39 | 28.7 | 100.0 | 100.0 |
| Filtrate | 29.29 | 0.0 | 99.6 | 0.0 |
| Residue | 0.10 | 23.6 | 0.4 | 82.1 |

It will be noted that at 220° C. for a longer period of time somewhat more of the sulfur produced was oxidized but the recovery is still very high.

Example 3

A copper concentrate similar in composition to that of Example 1 was mixed as follows at ambient temperature:

| | Parts |
|---|---|
| Concentrate | 300 |
| 98% sulfuric acid | 675 |

The mixture of the above ratio was fed to an internally heated rotating kiln that contained quartz stones of the following characteristics:

| | |
|---|---|
| Bulk density | 1.4 g./cc. |
| Voids | 45%. |
| Size | 100%+¼"−½". |

These stones were present in a volumetric ratio of 3 parts stones to 1 part mixture. The reaction was permitted to proceed for two hours at a temperature of 220° C. The entire contents of the kiln were washed with water and separated by screening and filtration into three fractions:

(1) stones
(2) solution
(3) residue

Analysis of the residue and the solution was completed with the following results:

| | Percent Copper | Percent Sulfur |
|---|---|---|
| Feed | 100.0 | 100.0 |
| Filtrate | 95.7 | 0.0 |
| Residue | 4.3 | 89.7 |

I claim:

1. A process for the treatment of ores or concentrates containing copper sulfide which comprises:
   (a) reacting the ores or concentrates with hot aqueous sulfuric acid whereby, at least in later stages the mixture of products and unreacted ore or concentrate components and aqueous acid is of plastic to solid consistency,
   (b) the reaction proceeding, in at least its later stages at a temperature above 160° C. and with a sulfuric acid concentration maintained above 80% $H_2SO_4$ for a time sufficient to transform a major amount of the reactive components of the ores or concentrates into metal sulfates, the amount of sulfuric acid, temperature and time being sufficiently low so that at least 10% of the sulfur content of the ores or concentrates as obtained in the form of elemental sulfur, and
   (c) dissolving the metal sulfates in aqueous solution.

2. A process according to claim 1 in which at least 50% of the sulfur content of the ores or concentrates is converted to elemental sulfur.

3. A process according to claim 2 in which heat is transferred at a rate which is controlled to maintain the temperature above 160° C. and the sulfuric acid concentration above 80% $H_2SO_4$ by evaporation of water.

4. A process according to claim 3 in which during the reaction heat is supplied at a rate to maintain the temperature and to evaporate water formed in the reaction between the sulfuric acid and the sulfides.

5. A process according to claim 3 in which the metallic sulfides are associated with larger particles, whereby the larger particles are coated with a reaction mixture of the sulfuric acid and the sulfides.

6. A process according to claim 5 in which the larger particles are substantially inert material having an average size of at least about ¼".

7. A process according to claim 5 in which the heat is supplied by hot gases and the coated larger particles are continuously kept in movement.

8. A process according to claim 6 in which the heat is supplied by hot gases and the coated larger particles are continuously kept in movement.

9. A process according to claim 1 in which the temperature is from 160° to 250° C.

10. A process according to claim 2 in which the temperature is from 160° to 250° C.

11. A process according to claim 3 in which the temperature is from 160° to 250° C.

12. A process according to claim 1 in which metal sulfates are separated from unreacted sulfides and at least a portion of the sulfides are recycled.

13. A process according to claim 2 in which metal sulfates are separated from unreacted sulfides and at least a portion of the sulfides are recycled.

14. A process according to claim 12 in which the ores and concentrates contain both copper sulfides and iron sulfides, and after separating from the sulfates the sulfides are subjected to selective froth flotation in the presence of a collector for copper sulfide and depressants for iron sulfide, whereby a concentrate is produced enriched in copper sulfide and lean in iron sulfide and the copper sulfide is recycled through the process.

15. A process according to claim 13 in which the ores and concentrates contain both copper sulfides and iron sulfides, and after separating from the sulfates the sulfides are subjected to selective froth flotation in the presence of a collector for copper sulfide and depressants for iron sulfide, whereby a concentrate is produced enriched in copper sulfide and lean in iron sulfide and the copper sulfide is recycled through the process.

16. A process according to claim 14 in which the ores and concentrates include precious metals and the precious metals are recovered by cyanidation before selective flotation.

17. A process according to claim 15 in which the ores and concentrates include precious metals and the precious metals are recovered by cyanidation before selective flotation.

18. A process according to claim 1 in which the ores and concentrates contain molybdenum disulfide, separating elemental sulfur from the unreacted sulfides and subjecting the sulfides to froth flotation in the presence of a collector for molybdenum disulfide, whereby a concentrate is produced rich in molybdenum disulfide and a tailing containing other sulfides, and this tailing is subjected to selective froth flotation in the presence of a collector for copper sulfide, to produce a concentrate rich in copper sulfide.

19. A process according to claim 2 in which the ores and concentrates contain molybdenum disulfide, separating elemental sulfur from the unreacted sulfides and subjecting the sulfides to froth flotation in the presence of a collector for molybdenum disulfide, whereby a concentrate is produced rich in molybdenum disulfide and a tailing containing other sulfides, and this tailing is subjected to selective froth flotation in the presence of a collector for copper sulfide, to produce a concentrate rich in copper sulfide.

References Cited
FOREIGN PATENTS 109,151   2/1899   Germany.

WAYLAND W. STALLARD, Primary Examiner

U.S. Cl. X.R.

75—117, 118; 423—36, 41, 45